(12) United States Patent
Almkvist et al.

(10) Patent No.: US 10,060,340 B2
(45) Date of Patent: Aug. 28, 2018

(54) TWIN SCROLL TURBOCHARGER DEVICE WITH IMPROVED TURBO RESPONSE

(71) Applicant: VOLVO CAR CORPORATION, Gothenburg (SE)

(72) Inventors: Goran Almkvist, Lerum (SE); Jonas J Bjorkholtz, Karna (SE); Jonas Forssell, Torslanda (SE); Oscar Garnemark, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 96 days.

(21) Appl. No.: 15/006,192

(22) Filed: Jan. 26, 2016

(65) Prior Publication Data
US 2016/0222874 A1    Aug. 4, 2016

(30) Foreign Application Priority Data
Feb. 2, 2015   (EP) .................................... 15153393

(51) Int. Cl.
*F02B 37/02*   (2006.01)
*F02D 41/00*   (2006.01)
(Continued)

(52) U.S. Cl.
CPC ............ *F02B 37/025* (2013.01); *F02B 37/10* (2013.01); *F02B 37/14* (2013.01); *F02B 37/168* (2013.01);
(Continued)

(58) Field of Classification Search
CPC ........ F02B 37/025; F02B 37/10; F02B 37/14; F02B 37/168; F02B 37/225; F02B 2037/125; F02D 41/0007; Y02T 10/144
See application file for complete search history.

(56) References Cited

U.S. PATENT DOCUMENTS 5,560,208 A    10/1996  Halimi et al.
2012/0260654 A1    10/2012  Proepper
2014/0219786 A1    8/2014  Zhu et al.

FOREIGN PATENT DOCUMENTS

DE    102009045380 A1    4/2011
DE    102010053057 A1    6/2012
(Continued)

OTHER PUBLICATIONS

Machine Translation of JP 57200618 (Kanesaka).*
Extended European Search Report dated May 19, 2015, Application No. 15153393.2-1606, Applicant Volvo Car Corporation, 9 Pages.

*Primary Examiner* — Brandon Lee
(74) *Attorney, Agent, or Firm* — Brooks Kushman P.C.

(57) ABSTRACT

The present disclosure relates to a twin scroll turbocharger device for an internal combustion engine having at least one combustion chamber. The turbocharger device comprises a turbine portion comprising a turbine wheel; a first turbine scroll and a second turbine scroll; and a first turbine scroll valve for allowing control of a flow of exhaust gas through the first turbine scroll. The turbocharger device also comprises a compressor portion comprising a compressor inlet; a compressor outlet; and a compressor wheel for pressurizing air received from the compressor inlet and providing pressurized air to the at least one combustion chamber via the compressor outlet. The turbocharger device further comprises a container for storing pressurized gas; a container conduit fluid flow connecting the container and the turbine portion for controllably providing pressurized air from the container to a first container inlet located between the first turbine scroll valve and the turbine wheel.

15 Claims, 2 Drawing Sheets

(51) Int. Cl.
  *F02B 37/10*   (2006.01)
  *F02B 37/14*   (2006.01)
  *F02B 37/16*   (2006.01)
  *F02B 37/22*   (2006.01)
  *F02B 37/12*   (2006.01)

(52) U.S. Cl.
  CPC ........ *F02B 37/225* (2013.01); *F02D 41/0007* (2013.01); *F02B 2037/125* (2013.01); *Y02T 10/144* (2013.01)

(56) References Cited

FOREIGN PATENT DOCUMENTS

| | | | |
|---|---|---|---|
| EP | 0754843 A2 | 1/1997 | |
| EP | 2749751 A1 | 7/2014 | |
| GB | 1140877 A | 1/1969 | |
| GB | 2121474 A | 12/1983 | |
| JP | 57200618 A | * 12/1982 | ............ F02B 37/025 |
| JP | 2006105026 A | 4/2006 | |
| WO | 2010095983 A1 | 8/2010 | |

* cited by examiner

TWIN SCROLL TURBOCHARGER DEVICE WITH IMPROVED TURBO RESPONSE

CROSS-REFERENCE TO RELATED APPLICATIONS

This application claims foreign priority benefits under 35 U.S.C. § 119(a)-(d) to European patent application number EP 15153393.2, filed Feb. 2, 2015, which is incorporated by reference in its entirety.

TECHNICAL FIELD

The present disclosure relates to a twin scroll turbocharger device and to an internal combustion engine comprising such a turbocharger device.

BACKGROUND

It is well known that the use of a turbocharger can increase the efficiency of an internal combustion engine by using the exhaust pressure to power a turbine, which in turn drives a compressor that boosts the pressure of the intake air.

Early turbochargers, however, often provided only an insignificant boost of the intake air pressure at low RPMs, and exhibited a significant so-called turbo lag (the time required to change power output in response to a throttle change).

One approach to expand the operating range (in RPMs) across which a significant boost is provided, is to use a so-called twin scroll turbocharger, in which exhaust gases are guided to the turbine wheel of the turbocharger through two separate scrolls. This approach enables a reduced minimum cross-sectional area of the flow channel between combustion chamber(s) and turbine wheel, which in turn provides for a relatively high flow speed of exhaust gas to the turbine wheel also at low RPMs.

For improving the turbo response (reduce the turbo lag), it has been proposed to provide pressurized air to the turbine of the turbocharger. For example, DE 10 2010 053 057 discloses a turbocharger device in which pressurized air is provided to the turbine from a storage container to quickly increase the rotation of the turbine wheel.

Although the turbocharger according to DE 10 2010 053 057 appears to be capable of reducing the turbo lag, it would be desirable to provide for a further reduction in the turbo lag and/or a more energy efficient way of reducing the turbo lag.

SUMMARY

In view of above-mentioned and other drawbacks of the prior art, it is an object of the present disclosure to provide for improved turbocharging of an internal combustion engine, and in particular to provide for reduced turbo lag and/or a more energy efficient reduction of the turbo lag in a turbocharger device.

According to a first aspect of the present disclosure, it is therefore provided a twin scroll turbocharger device for an internal combustion engine having at least one combustion chamber, the twin scroll turbocharger device comprising: a turbine portion comprising a turbine wheel; a first turbine scroll and a second turbine scroll for receiving exhaust gas from the at least one combustion chamber and guiding the exhaust gas towards the turbine wheel to cause the turbine wheel to rotate; and a first turbine scroll valve for allowing control of a flow of the exhaust gas through the first turbine scroll; a compressor portion comprising a compressor inlet; a compressor outlet; and a compressor wheel for pressurizing air received from the compressor inlet and providing pressurized air to the at least one combustion chamber via the compressor outlet, the compressor wheel being coupled to the turbine wheel to rotate in response to rotation of the turbine wheel; a container for storing pressurized gas; a container conduit fluid flow connecting the container and the turbine portion for providing pressurized air from the container to a first container inlet in the first turbine scroll, the first container inlet being located between the first turbine scroll valve and the turbine wheel; and a container conduit valve for allowing control of a flow of the pressurized gas through the container conduit.

The first and second turbine scrolls, which separately guide exhaust gas towards the turbine wheel, may for example be arranged side by side, or separated in a radial direction.

The first and second turbine scrolls may have different minimum flow cross-sections, providing for different flow speeds for a given mass flow of exhaust gas.

Through the first turbine scroll valve, flow of exhaust gas from the combustion chamber can be prevented from reaching the turbine wheel through the first turbine scroll.

The turbine wheel may typically be enclosed by a turbine housing, and the first and second turbine scrolls may be formed in the turbine housing.

The present disclosure is based on the realization that a desired pressure difference across the turbine wheel can be achieved quickly and efficiently by temporarily forming a relatively small "pressure chamber" upstream from the turbine wheel, and injecting air from the container into this "pressure chamber". The present inventors have further realized that, through the provision of the first turbine scroll valve and the container inlet located between the first turbine scroll valve and the turbine wheel, such a relatively small pressure chamber can temporarily be formed by closing the first turbine scroll valve.

In the turbocharger device disclosed in DE 10 2010 053 057, a considerably larger pressure chamber is formed by both turbine scrolls and the exhaust manifold of the internal combustion engine, requiring a considerably larger volume of pressurized air to be injected before achieving the desired increase in the rotation of the turbine wheel of the turbocharger.

Hence, embodiments of the twin scroll turbocharger device according to the present disclosure provide for a fast increase in the rotation of the turbine wheel using a relatively small amount of compressed air. This, in turn, enables the use of a smaller container for pressurized gas and/or allows for spending less energy on supplying pressurized gas to the container. Accordingly, embodiments of the present disclosure provide for a faster and/or more energy efficient operation of the turbocharger.

According to various embodiments of the present disclosure, the twin scroll turbocharger device may further comprise a bypass conduit fluid flow connecting the compressor portion and the turbine portion for providing pressurized air from the compressor portion to a first bypass inlet in the first turbine scroll located between the first turbine scroll valve and the turbine wheel; and a bypass conduit valve for allowing control of a flow of the pressurized air through the bypass conduit.

Through the bypass conduit, pressurized air from the compressor portion can be used for increasing the mass flow through the turbine, which may be particularly beneficial for increasing the power boost provided by the turbocharger at relatively low RPMs. Furthermore, allowing some of the pressurized air provided from the compressor to bypass into the turbine portion allows for an increase in the mass flow through the compressor portion, which in turn reduces the risk of so-called compressor surge. At the same time the energy carried by the bypassed pressurized air is recovered in the turbine portion, providing for a further improved energy efficiency of the turbocharger according to the present disclosure.

In embodiments, the first container inlet and the first bypass inlet may be provided as a first common inlet, which may save space in the first turbine scroll and/or facilitate the design of the first turbine scroll.

According to various embodiments, furthermore, the turbine portion may further comprise a second turbine scroll valve for allowing control of a flow of the exhaust gas through the second turbine scroll.

The provision of a second turbine scroll valve additionally allowing control of the flow through the second turbine scroll provides for more freedom in controlling operation of the turbocharger device.

In embodiments, the above-mentioned bypass conduit may provide for controllable fluid flow of pressurized air from the compressor portion to the second turbine scroll, to a second turbine scroll inlet arranged between the second turbine scroll valve and the turbine wheel.

In other embodiments, a further bypass conduit, may be provided between the compressor portion and the second turbine scroll, such that pressurized air may be provided from the compressor portion to a selected one or both of the first and second turbine scrolls.

Moreover, the twin scroll turbocharger device according to various embodiments of the present disclosure may be included in an internal combustion engine, further comprising at least one exhaust chamber; a first flow arrangement connecting the at least one exhaust chamber with the first and second turbine scrolls of the twin scroll turbocharger device for providing exhaust gas from the at least one exhaust chamber to the turbine wheel of the twin scroll turbocharger device; a second flow arrangement connecting the compressor outlet of the twin scroll turbocharger device with the at least one exhaust chamber for providing pressurized air to the at least one exhaust chamber; a first scroll valve actuator for actuating the first turbine scroll valve; a container valve actuator for actuating the container conduit valve; and an engine control unit having: an input for acquiring a signal indicative of a desired operation of the internal combustion engine; and first and second outputs connected to the first scroll valve actuator and the container valve actuator, respectively, for controlling fluid flow settings of the first turbine scroll valve and the container conduit valve based on the desired operation of the internal combustion engine.

When the acquired signal indicates that an increased output power from the internal combustion engine is desired, the engine control unit may advantageously control the first scroll valve actuator to restrict flow past the first turbine scroll valve; and control the container valve actuator to allow gas flow from the container into the first turbine scroll.

Within a predetermined period of time, which may advantageously be shorter than one second, the engine control unit may again close the container valve.

For efficient operation, providing for the use of a relatively small container, the engine control unit may be configured to control the container valve to keep the pressure inside the first turbine scroll below about 6 bar (600 kPa). Even more advantageously, the engine control unit may be configured to control the container valve to keep the pressure inside the first turbine scroll below about 4 bar (400 kPa). Hereby, operation of the turbine can be optimized in respect of energy efficiency. This may be achieved in various ways depending on the configuration of the container valve. For instance, the container valve can be partly opened, or the container valve can be controlled to alternate between fully closed and fully opened with a duty cycle selected to achieve the desired pressure in the first turbine scroll.

According to a second aspect of the present disclosure, there is provided a method of controlling operation of the internal combustion engine according to the present disclosure, comprising the steps of: acquiring, by the engine control unit, a signal indicative of a desired operation of the internal combustion engine; evaluating, by the engine control unit, the acquired signal; controlling, by the engine control unit based on the evaluation, the first scroll valve actuator and the container valve actuator to achieve fluid flow settings of the first turbine scroll valve and the container conduit valve supporting the desired operation.

According to embodiments of the method of the present disclosure, the control sequence for the various conduit valves may, for example, be as follows:
  closing the first scroll conduit valve (unless it is already closed);
  closing the bypass conduit valve (unless it is already closed);
  opening the container conduit valve;
  closing the container conduit valve;
  opening the bypass conduit valve;
  closing the bypass conduit valve (unless the ECU determines that the first scroll conduit valve should remain closed); and
  opening the first scroll conduit valve (unless the ECU determines that the first scroll conduit valve should remain closed).

This control sequence by the ECU may, for example, be advantageous in a situation where the RPM of the engine is still so low after a "pulse" of pressurized gas from the container provided through operation of the container conduit valve that continued supply of pressurized gas (via the bypass conduit) is determined to be needed to achieve maximum torque. This may, for instance, be the case when using a manual gearbox and the driver depresses the accelerator at low engine speeds.

Embodiments and variations of this second aspect of the present disclosure largely correspond to the above-described embodiments and variations of the first aspect of the disclosure.

In summary, according to various embodiments the present disclosure relates to a twin scroll turbocharger device for an internal combustion engine having at least one combustion chamber. The twin scroll turbocharger device comprises a turbine portion comprising a turbine wheel; a first turbine scroll and a second turbine scroll; and a first turbine scroll valve for allowing control of a flow of the exhaust gas through the first turbine scroll; a compressor portion comprising a compressor inlet; a compressor outlet; and a compressor wheel for pressurizing air received from the compressor inlet and providing pressurized air to the at least one combustion chamber via the compressor outlet. The twin scroll turbocharger device further comprises a container for storing pressurized gas; a container conduit fluid flow connecting the container and the turbine portion for controllably providing pressurized air from the container to a first container inlet located between the first turbine scroll valve and the turbine wheel.

Closed and open position herein is considered to also include an essentially closed or an essentially open position. In realizations of turbocharging systems and like where valves are used, due to e.g., manufacturing tolerances and thermal effects it is often neither necessary nor possible that respective valve hermetically closes respective conduit, inlet, outlet or like.

BRIEF DESCRIPTION OF THE DRAWINGS

These and other aspects of the present disclosure will now be described in more detail, with reference to the appended drawings showing an example embodiment of the disclosure.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of a turbocharger, internal combustion engine (ICE), and method according to the present disclosure are mainly described with reference to a twin turbocharger device having first and second turbine scrolls arranged side-by-side, where the flow from combustion chambers through the first turbine scroll is controllable by means of a first turbine scroll valve. Furthermore, a single exhaust manifold is shown to connect all the combustion chambers with both the first and second turbine scrolls.

It should be noted that this by no means limits the scope of the present disclosure, which equally well includes, for example, twin scroll turbocharger devices having first and second turbine scrolls that are arranged differently in relation to each other, such as offset in a radial direction in respect of the turbine wheel. Furthermore, the second turbine scroll may also be provided with a scroll valve and the flow from the combustions chambers through the second turbine scroll may thus also be controllable. Moreover, the ICE may be provided with two separated exhaust manifolds, which may be connected to a respective one of the first and second turbine scrolls. In such embodiments, the first turbine scroll valve may advantageously be configured to connect both exhaust manifolds to the second turbine scroll when closing the first turbine scroll (substantially preventing passage of exhaust gas past the first turbine scroll valve.

Figure 1:
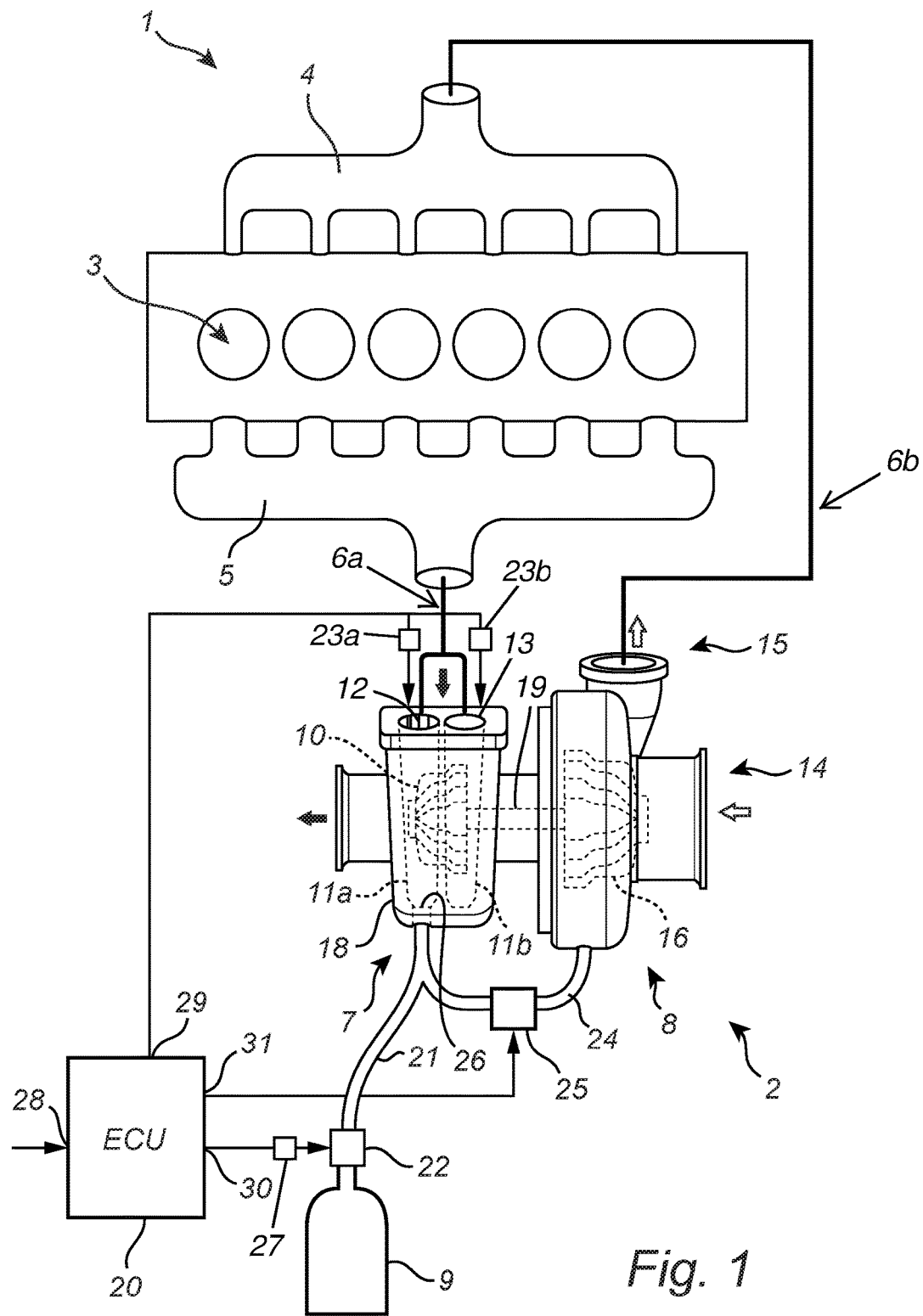
FIG. 1 schematically shows an internal combustion engine (ICE) comprising a twin scroll turbocharger device according to an example embodiment of the present disclosure.

FIG. 1 schematically shows an ICE 1 comprising a twin scroll turbocharger device (turbo device) 2, a number of combustion chambers 3, an intake manifold 4, an exhaust chamber or exhaust manifold 5 and an engine control unit (ECU) 20 for controlling operation of the ICE.

The turbo device 2 comprises a turbine portion 7, a compressor portion 8, and a container 9 for storing pressurized gas. The turbine portion 7 includes a turbine wheel 10, a first turbine scroll 11a, a second turbine scroll 11b, and a first turbine scroll valve 12. The compressor portion comprises a compressor inlet 14, a compressor outlet 15, and a compressor wheel 16. In the exemplary embodiment shown in FIG. 1, the turbo device 2 comprises a turbo housing 18 enclosing the turbine wheel 10 and the compressor wheel 16 and forming the different fluid flow paths in the turbo device 2. The turbine wheel 10 and the compressor wheel 16 are, moreover, connected by a shaft 19, so that rotation of the turbine wheel 10 results in rotation of the compressor wheel 16.

As is schematically shown in FIG. 1, the container 9 is fluid flow connected to first turbine scroll 11a via a container conduit 21. Along the container conduit 21 is provided a container conduit valve 22 for allowing control of the flow of the pressurized gas through the container conduit. The schematic box on the container conduit 21 shown in FIG. 1 (as well as schematic boxes, etc., on other conduits in FIG. 1) should be understood to represent a valve capable of being controlled using an electrical signal, and may include a mechanical valve and an actuator for actuating the valve. It should be noted that the design and configuration of suitable controllable valves is well within the reach of the skilled person in the field of engine design.

Additionally, the turbo device 2 comprises a bypass conduit 24 fluid flow connecting the compressor portion 8 and the turbine portion 7 for providing pressurized air from the compressor portion 8 to the first turbine scroll 11a. Along the bypass conduit 24 is provided a bypass conduit valve 25 for allowing control of the flow of the pressurized air through the bypass conduit 24.

In the presently illustrated example embodiment, the container conduit 21 and the bypass conduit 24 are fluid flow connected to the first turbine scroll 11a through a first common inlet 26 arranged between the first turbine scroll valve 12 and the turbine wheel 10.

As is schematically illustrated in FIG. 1, ECU 20 comprises an input 28 for acquiring a signal indicative of a desired operation of the ICE 1, a first output 29 connected to the first turbine scroll valve 12 through first scroll valve actuator 23a and to second turbine scroll valve 13 through second scroll valve actuator 23b, a second output 30 connected to the container valve 22 through container valve actuator 27, and a third output 31 connected to the bypass valve 25. Although not explicitly shown in FIG. 1, it should be understood that the ECU typically comprises processing circuitry, such as one or several microprocessors, and memory or storage for storing computer executable instructions (e.g., code) that are executable by the processing circuitry for controlling operation of the processing circuitry and for performing the particular algorithms represented by the functions and/or operations described herein. The ECU 20 may also, or instead, include an application specific integrated circuit (ASIC), a programmable gate array or programmable array logic, a programmable logic device, or a digital signal processor (DSP).

In operation, exhaust gas from the combustion chambers 3 is provided to turbine portion 7 of the turbo device 2 via the exhaust manifold 5 and first flow arrangement 6a. In particular, the exhaust gas is guided towards the turbine wheel 10 through at least one of the first 11a and second 11b turbine scrolls. The exhaust gas rotates the turbine wheel and thereafter exits the turbo device 2 towards the exhaust system, as is schematically indicated by the filled block arrows in FIG. 1.

Since the turbine wheel 10 and the compressor wheel 16 are connected by the shaft 19, the rotation of the turbine wheel 10 will result in rotation of the compressor wheel 16 so that air received from the compressor inlet 15 via second flow arrangement 6b is pressurized and pressurized air is provided to the combustion chambers 3 via the intake manifold 4 as is schematically shown in FIG. 1.

Depending on the desired operation of the ICE, it may be desirable to modify flow paths in the turbo device 2 to affect the mass flow of air from the compressor portion 8 to the combustion chamber and/or the change in mass flow of air in response to a change in the desired operation of the ICE.

To that end, the ECU may be configured, for instance through a set of instructions stored in memory in the ECU, to control one or several of the first turbine scroll valve 12, the container valve 22 and the bypass valve 25 depending on the signal indicative of the desired operation received through the input 28 of the ECU.

For example, when the signal at the input 28 indicates steady state operation of the ICE at low RPMs, the ECU may control the first turbine scroll valve 12 to its closed state to increase the fluid speed through the second turbine scroll, and the bypass valve 25 to its open state to allow some of the pressurized air in the compressor portion 8 to be diverted into the first turbine scroll between the closed first turbine scroll valve 12 and the turbine wheel 10. This will provide for increased mass flow through the turbine portion 7 and counteract compressor surge. These measures will provide for improved the efficiency of the ICE during steady state operation at low RPMs.

When the signal at the input 28 indicates a relatively slow increase in RPM to a steady state operation of the ICE at higher RPMs, the ECU may, in accordance with the above-mentioned stored set of instructions, control the first turbine scroll valve 12 to open the first turbine scroll 11a and control the bypass conduit valve 25 to close the bypass conduit 24.

Figure 2:
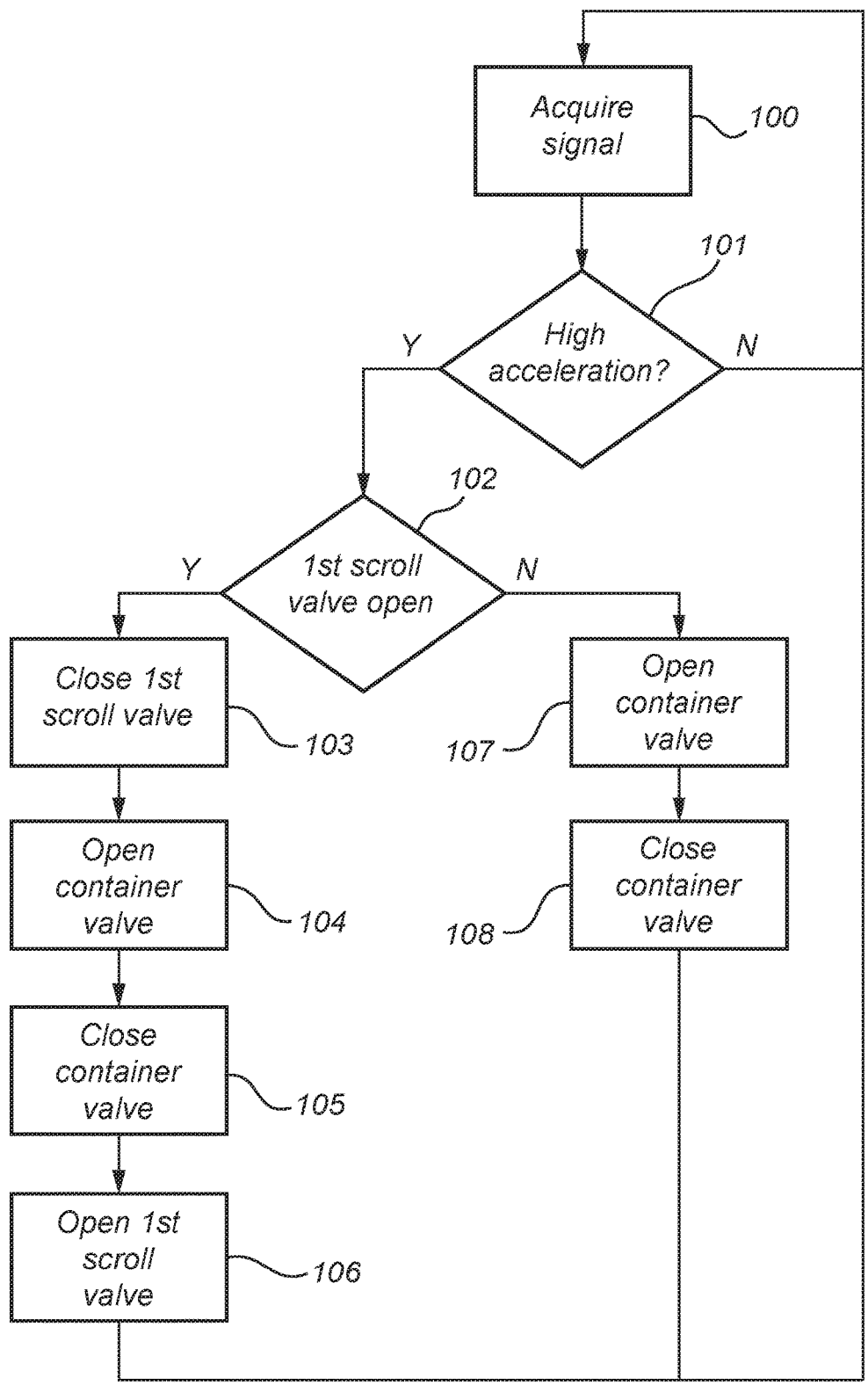
FIG. 2 is a flow-chart schematically illustrating a method according to an example embodiment of the present disclosure.

An example embodiment of a method for controlling the ICE in FIG. 1 in response to the signal at the input 28 indicating a desired high acceleration will now be described with reference additionally to the flow-chart in FIG. 2.

In a first step 100, a signal indicating the desired operation of the ICE is acquired by the ECU 20 through the input 28. According to one example, this signal may emanate from one or more sensors sensing the position of the accelerator. In the subsequent step 101, it is determined if the acquired signal indicates that a high acceleration is desired.

If this is not the case, that is, if the desired acceleration is, for example, determined to be below a predefined threshold value, the method returns to the first step 100 and continues to acquire the input signal.

If, on the other hand, it is determined in step 101 that an acceleration higher than the predefined threshold value is desired, the method proceeds to determine, in step 102, if the first scroll valve 12 is open.

If it is determined that the first scroll valve 12 is open, the method proceeds to step 103, in which the first scroll valve is closed by providing a signal from the first output 29 of the ECU to the first scroll valve 12.

After the first scroll valve 12 has been closed in step 103, the container valve 22 is opened in step 104 by providing a signal from the second output 30 of the ECU to the container valve 22.

As a result of closing the first scroll valve 12 and opening the container valve 22, pressurized air from the container 9 will flow into the relatively small space between the first scroll valve 12 and the turbine wheel 10 and quickly increase the rotation of the turbine wheel 10, resulting in very fast turbo response. Since the space between the first scroll valve 12 and the turbine wheel 10 is so small (much smaller than, for example, the first and second turbine scrolls and the exhaust manifold 5 together), a relatively small amount of pressurized gas needs to be supplied from the container 9 to achieve the desired quick increase in the rotation of the turbine wheel 10. Hence, a relatively small container 9 may be used and less energy is required for refilling the container 9 with pressurized gas, such as air.

After a time needed for the exhaust pressure in the exhaust manifold 5 to build up so that the extra boost from the container 9 is no longer needed to maintain the turbine wheel rotation, the container valve 22 is again closed in step 105, and the first scroll valve 12 is opened in step 106. Thereafter, the method returns to step 100.

The time period during which the first scroll valve 12 is controlled to be closed and the container valve 22 is controlled to be open may be dependent on the configuration of the ICE as well as other factors, such as the operating point of the ICE. A typical time period may be less than one second, such as about one half second.

If it is determined in step 102 that the first scroll valve 12 was already closed, the method instead proceeds to steps 107 and 108 to open and close the container valve 22 as described above with reference to steps 104 and 105.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

While exemplary embodiments are described above, it is not intended that these embodiments describe all possible forms of the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An internal combustion engine comprising:
   at least one combustion chamber;
   a twin scroll turbocharger device comprising
      a turbine portion comprising a turbine wheel, a first turbine scroll and a second turbine scroll for receiving exhaust gas from the at least one combustion chamber and guiding the exhaust gas towards the turbine wheel to cause the turbine wheel to rotate, and a first turbine scroll valve controllable to prevent a flow of the exhaust gas through the first turbine scroll;
      a compressor portion comprising a compressor inlet, a compressor outlet, and a compressor wheel for pressurizing air received from the compressor inlet and providing pressurized air to the at least one combustion chamber via the compressor outlet, the compressor wheel being configured to be coupled to the turbine wheel to rotate in response to rotation of the turbine wheel;
a container for storing pressurized gas;
a container conduit configured to connect the container and the turbine portion for providing pressurized air from the container to a first container inlet in the first turbine scroll, the first container inlet being located between the first turbine scroll valve and the turbine wheel; and
a container conduit valve for allowing control of a flow of the pressurized gas through the container conduit;
a first flow arrangement connecting the at least one combustion chamber with the first and second turbine scrolls of the twin scroll turbocharger device for providing exhaust gas from the at least one combustion chamber to the turbine wheel of the twin scroll turbocharger device;
a second flow arrangement connecting the compressor outlet of the twin scroll turbocharger device with the at least one combustion chamber for providing pressurized air to the at least one combustion chamber;
a first scroll valve actuator for actuating the first turbine scroll valve;
a container valve actuator for actuating the container conduit valve; and
an engine control unit configured to acquire a signal indicative of a desired operation of the internal combustion engine and having first and second outputs connected to the first scroll valve actuator and the container valve actuator, respectively, for controlling fluid flow settings of the first turbine scroll valve and the container conduit vale based on the desired operation of the internal combustion engine,
wherein, when the signal acquired by the engine control unit indicates that an increased output power from the internal combustion engine is desired, the engine control unit is configured to
control the first scroll valve actuator to restrict flow past the first turbine scroll valve; and
control the container valve actuator to allow gas flow from the container into the first turbine scroll while the first scroll valve actuator restricts flow past the first turbine scroll valve.

2. The internal combustion engine according to claim 1 wherein the twin scroll turbocharger device further comprises:
a bypass conduit configured to fluid flow connect the compressor portion and the turbine portion for providing pressurized air from the compressor portion to a first bypass inlet in the first turbine scroll located between the first turbine scroll valve and the turbine wheel; and
a bypass conduit valve for allowing control of a flow of the pressurized air through the bypass conduit.

3. The internal combustion engine according to claim 2 wherein the first container inlet and the first bypass inlet are provided as a first common inlet.

4. The internal combustion engine according to claim 1 wherein the turbine portion further comprises a second turbine scroll valve for allowing control of a flow of the exhaust gas through the second turbine scroll.

5. The internal combustion engine according to claim 4 further comprising:
a bypass conduit configured to fluid flow connect the compressor portion and the turbine portion for providing pressurized air from the compressor portion to a second bypass inlet in the second turbine scroll located between the second turbine scroll valve and the turbine wheel; and
a bypass conduit valve for allowing control of a flow of the pressurized air through the bypass conduit.

6. The internal combustion engine according to claim 1 wherein the engine control unit, after a predetermined period of time from allowing gas flow from the container into the first turbine scroll, is configured to:
control the container valve actuator to prevent gas flow from the container into the first turbine scroll; and
control the first scroll valve actuator to allow flow past the first turbine scroll valve.

7. The internal combustion engine according to claim 1 wherein the engine control unit is configured to control the container valve actuator to allow flow past the container valve at such a flow rate to establish a pressure of less than 6 bar inside the first turbine scroll.

8. A method of controlling operation of the internal combustion engine according to claim 1, the method comprising:
acquiring, by the engine control unit, a signal indicative of a desired operation of the internal combustion engine;
evaluating, by the engine control unit, the acquired signal; and
controlling, by the engine control unit based on the evaluation, at least the first scroll valve actuator and the container valve actuator to achieve fluid flow settings of the first turbine scroll valve and the container conduit valve supporting the desired operation;
wherein
the acquired signal indicates a desired increase in power output of the internal combustion engine; and
the step of controlling comprises:
controlling the first scroll valve actuator to close the first turbine scroll valve; and
controlling the container valve actuator to open the container conduit valve while the first turbine valve is closed.

9. The method according to claim 8 further comprising:
controlling, after a predetermined period of time from controlling the container valve actuator to open the container conduit valve, the container valve actuator to close the container conduit valve; and
controlling, after having closed the container conduit valve, the first scroll valve actuator to open the first turbine scroll valve.

10. The method according to claim 9 wherein the twin scroll turbocharger device further comprises a bypass conduit that connects the compressor portion and the turbine portion for providing pressurized air from the compressor portion to a first bypass inlet in the first turbine scroll located between the first turbine scroll valve and the turbine wheel, and a bypass conduit valve for allowing control of a flow of the pressurized air through the bypass conduit, and wherein the method further comprises:
controlling, after having closed the container conduit valve and before opening the first turbine scroll valve, the bypass conduit valve to open.

11. The method according to claim 10 further comprising controlling, before opening the first turbine scroll valve, the bypass conduit valve to close.

12. The method according to claim 9 wherein the predetermined period of time is shorter than one second.

13. A method of controlling operation of an internal combustion engine having at least one combustion chamber, a twin scroll turbocharger device including first and second turbine scrolls, a container for storing pressurized gas, a container conduit that connects the container and the turbocharger device, a first flow arrangement that connects the at least one combustion chamber with the first and second turbine scrolls of the turbocharger device, a second flow arrangement that connects a compressor outlet of the turbocharger device with the at least one combustion chamber for providing pressurized air to the at least one combustion chamber, and an engine control unit, the method comprising:

acquiring, by the engine control unit, a signal indicative of a desired operation of the internal combustion engine;

evaluating, by the engine control unit, the acquired signal; and controlling, by the engine control unit based on the evaluation, a first turbine scroll valve of the turbocharger device and a container conduit valve of the turbocharger device to achieve fluid flow settings of the first turbine scroll valve and the container conduit valve supporting the desired operation, wherein the first turbine scroll valve is configured to control a flow of exhaust gas through the first turbine scroll, and the container conduit valve is configured to control flow of pressurized gas through the container conduit;

wherein the acquired signal indicates a desired increase in power output of the internal combustion engine; and the step of controlling comprises:

controlling the first scroll valve actuator to close the first turbine scroll valve; and controlling the container valve actuator to open the container conduit valve while the first turbine valve is closed.

14. The method according to claim 13 wherein the turbocharger device comprises a turbine portion including the first and second turbine scrolls, the first turbine scroll valve and a turbine wheel, the method further comprising the first and second turbine scrolls receiving exhaust gas from the at least one combustion chamber and guiding the exhaust gas toward the turbine wheel to cause the turbine wheel to rotate.

15. The method according to claim 14 wherein the turbocharger device further comprises a compressor portion including a compressor inlet, a compressor outlet, and a compressor wheel coupled to the turbine wheel, the method further comprising the compressor wheel pressurizing air received from the compressor inlet, providing pressurized air to the at least one combustion chamber via the compressor outlet, and rotating in response to rotation of the turbine wheel.

* * * * *